(12) United States Patent
Ballot

(10) Patent No.: US 8,601,186 B2
(45) Date of Patent: Dec. 3, 2013

(54) MANAGEMENT OF A USB HOST DEVICE

(75) Inventor: Nathalie Ballot, Sassenage (FR)

(73) Assignee: ST-Ericsson SA, Plan-les-Ouates (CH)

( * ) Notice: Subject to any disclaimer, the term of this patent is extended or adjusted under 35 U.S.C. 154(b) by 165 days.

(21) Appl. No.: 13/379,854

(22) PCT Filed: Jun. 28, 2010

(86) PCT No.: PCT/EP2010/059148
§ 371 (c)(1),
(2), (4) Date: Dec. 21, 2011

(87) PCT Pub. No.: WO2010/149793
PCT Pub. Date: Dec. 29, 2010

(65) Prior Publication Data
US 2012/0096197 A1   Apr. 19, 2012

(30) Foreign Application Priority Data
Jun. 26, 2009 (FR) ...................... 09 54397

(51) Int. Cl.
*G06F 5/00* (2006.01)
*G06F 13/20* (2006.01)
(52) U.S. Cl.
USPC ............................ 710/61; 710/313; 713/320
(58) Field of Classification Search
USPC ................. 710/58–61, 305, 313; 713/320
See application file for complete search history.

(56) References Cited

U.S. PATENT DOCUMENTS

| 5,140,539 A * | 8/1992 | Ohdaira ................. 713/321 |
| 6,233,596 B1 * | 5/2001 | Kubota et al. ............. 708/603 |
| 6,986,141 B1 * | 1/2006 | Diepstraten et al. ......... 718/108 |
| 7,076,683 B2 | 7/2006 | Saito et al. |
| 7,278,047 B2 * | 10/2007 | Douglas et al. ............. 713/600 |
| 7,493,505 B2 * | 2/2009 | Leung ..................... 713/323 |
| 2005/0201411 A1 | 9/2005 | Shibata |
| 2006/0136725 A1 * | 6/2006 | Walmsley .................. 713/171 |
| 2011/0035613 A1 * | 2/2011 | Rancurel et al. ............ 713/323 |
| 2012/0117280 A1 * | 5/2012 | Ballot et al. ................ 710/17 |

FOREIGN PATENT DOCUMENTS

| JP | 2000183894 A | 6/2000 |
| WO | 9827482 A1 | 6/1998 |

OTHER PUBLICATIONS

USB Implementiers Group: "Universal Serial Bus Specification", Apr. 27, 2000, Rev. 2.0, pp. 15-24, XP002552372, Compaq Computer Corporation, the whole document.
ULPI ORG: "UTMI+ Low Pin Interface (ULPI), Specification Revision 1.1" Internet Citation, Oct. 20, 2004, pp. 1-20, XP002495383, Retrieved from the Internet: URL:http://www.ulpi.org/ULPI_va_1.zip [retrieved on Sep. 10, 2008], the whole document.

* cited by examiner

*Primary Examiner* — Christopher Shin
(74) *Attorney, Agent, or Firm* — Coats and Bennett PLLC

(57) ABSTRACT

A host device is managed that communicates with a peripheral device via an interface on the basis of a high frequency clock; the host device is in a suspended state in which the high frequency clock is deactivated. At the host device, an activation state of the peripheral device is detected (21) on the interface. Then the duration of a period of time ($T_1$) since the detection of the activation state is counted, on the basis of a low frequency clock. Then this activation state is maintained on the interface (23) by means of hardware before the period of time expires.

6 Claims, 4 Drawing Sheets

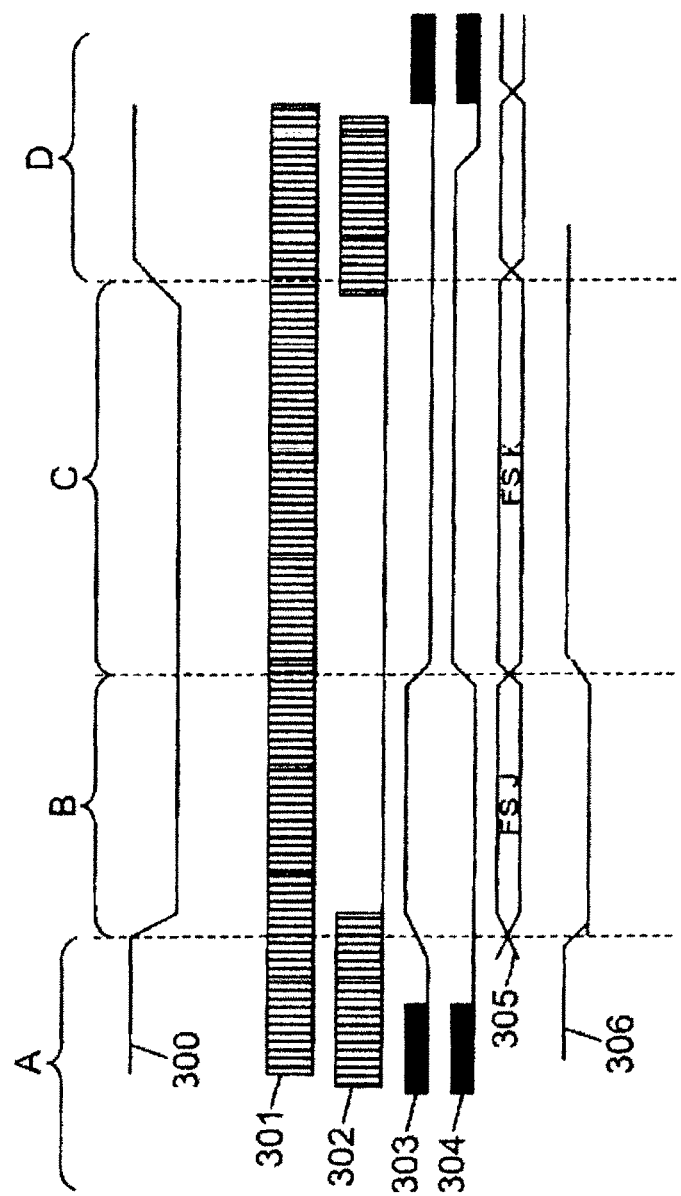

MANAGEMENT OF A USB HOST DEVICE

This invention relates to a host device offering a USB (Universal Serial Bus) port for a peripheral device, and more particularly the management of the power consumption of such a host device.

FIG. 1 illustrates a conventional USB system 11 in which a host USB device 10 and a peripheral USB device 14 are connected by a USB interface 15. As a non-limiting example, the host USB device 10 can correspond to a computer while the peripheral device 14 can be a computer mouse.

The host USB device 10 comprises a control unit 12 which is a unit that is generally software for the most part and an interface unit 13 which is for the most part generally implemented as hardware. This control unit and this interface unit are linked to each other via an interface 16. This host device is powered via a power connector PWR. It also has a high frequency clock 105 and a low frequency clock 104 which are provided via a multiplexer 102.

In the USB standard, particularly USB Specification Version 2.0, the host USB device 10 is in charge of controlling certain timings. For this purpose, it has a high frequency clock which is used for exchanges between the host device 10 and the peripheral device 14. This high frequency clock can have a frequency on the order of 38 MHz.

The USB standard cited above offers the possibility of the host USB device operating in a SUSPENDED state, particularly when no activity is detected on the USB interface 15 or when this state is selected (section 7.1.7.6 of the USB specification version 2.0). In this suspended state, the high frequency clock HF can be deactivated.

However, this USB standard requires that the host device 10 operating in a suspended state be able to assume control of the interface 15 with the peripheral device 14 within a given period, when activity of the peripheral device is detected. This functionality is described in the USB specification version 2.0 in section 7.1.7.7 Resume, under the term 'remote wakeup capability'.

However, this given period is relatively short compared to the period of time required to reactivate the high frequency clock, once it has been deactivated. As a result, it is unreasonable to expect the host device to wake up and assume control of the interface 15 on the basis of the high frequency clock, within the time required by the standard.

Even so, it is highly advantageous to be able to switch the host device to a suspended state in which the high frequency clock is off. Once the high frequency clock is deactivated, the power consumption of the device can be substantially reduced.

This invention aims to improve the situation.

A first aspect of the invention proposes a process for managing a host device communicating with a peripheral device via an interface on the basis of a high frequency clock;
said host device being in a suspended state in which the high frequency clock is deactivated;
said process comprising the following steps at the host device:
/1/ detecting an activation state of the peripheral device on said interface;
/2/ determining the duration of a period of time since step /1/, on the basis of a low frequency clock; and
/3/ maintaining said activation state on said interface by hardware means before the expiration of said period of time.

Moreover, as the host device comprises a control unit and an interface unit interfacing with the peripheral device, the units being linked to each other via a ULPI interface on the basis of the high frequency clock, step /3/ is carried out by the interface unit, until a period of active operation begins for the host device.

The phrase "maintaining an activation state on an interface" is understood to mean the hiding of any actual changes in the signals on this interface so as to forcibly maintain a previous signal, even if said previous signal has actually been modified on the interface.

When a host device is in a suspended state, it should be possible to wake it up if activity of a peripheral device connected to it is detected, no matter how minor the activity, so that the host device can be aware of the activity and process it correctly. It is preferable not to wake up the host device at the slightest change on the interface, because a tiny change may not correspond to actual activity of the peripheral device. On the other hand, a user of a peripheral device should be offered precise detection of activity of the peripheral without the peripheral having to signal its activity for a long period of time. For example, when the peripheral is a computer mouse, the host device such as a computer should take into account all mouse movements even if the movements are small.

In order to guarantee precise detection of activity of a peripheral device, the host device assumes control of the interface 15 within a period of time defined so as to maintain the activation state detected on the interface in a controlled manner, even if the actual activity of the peripheral device has ended. This characteristic allows even minor activity to be taken into account at the host device. The host device is thus aware of the activities of the peripheral device.

To allow the host device such assumption of control of the interface 15 within a defined period of time, when it is in a suspended state in which the high frequency clock is deactivated, it is advantageous to use a low frequency clock to calculate the duration of the period of time concerned.

Due to these arrangements, when activity of the peripheral device is detected it is possible to assume control of the interface, meaning to force a state on the interface 15 between a host device and a peripheral device, at the host device, without using a high frequency clock. It is thus unnecessary to wait for complete activation of the high frequency clock in order to meet certain time constraints concerning host device wakeup when activity of a peripheral device is detected.

As a result, the host device can advantageously switch to the suspended state once the peripheral device or devices to which it is connected remain inactive for a certain amount of time, or when a decision is made elsewhere, because it is adapted to wake up within a defined period of time. In this manner, the amount of energy consumed can be considerably reduced. When the host device is a mobile device, such as a laptop computer or mobile telephone or video camera or any other portable terminal which has at least one USB port, the implementation of such a management process according to an embodiment of the invention can represent a highly advantageous gain in autonomy.

The advantageous use of the low frequency clock allows meeting USB standards concerning certain time requirements.

To meet other requirements, the high frequency clock can be activated in step /1/, step /1/ being performed by the interface unit. Once the clock is activated, the host device is in an active state. It is then operational, and the interface with the peripheral device can once again be used on the basis of the high frequency clock.

Once the high frequency clock is activated, the activation state can be maintained on the interface between the host device and the peripheral device by means of software, in other words by sending a message. This returns us to a conventional context of host device operation.

The activation state can be maintained for another period of time. This period of time can advantageously allow taking into account an activity of the peripheral device, even if brief. The host device is thus aware of any type of activity of the peripheral device.

In one embodiment of the invention, the host device comprises a control functionality and an interface functionality with the peripheral device, said functionalities being linked to each other via another interface which is ULPI (Utmi Low Pin Interface, for example version USB2.O of the Transceiver Macrocell Interface) and based on the high frequency clock. In this case, step /3/ is carried out by the interface functionality. Step /3/ can then be implemented in particular by latches or flip-flops. This interface functionality (or USB Transceiver) can be implemented by means of hardware for the most part.

A second aspect of the invention proposes an interface unit comprising means for implementing a process for managing a host device according to the first aspect of the invention.

Such an interface unit can correspond to a USB Transceiver within a USB host device. This interface unit can be linked to a USB control unit, or USB Controller, via a ULPI (Unit Level Prototype Implementation) interface or via a UTMI (USB Transceiver Macrocell Interface) interface.

No limitation is placed on the invention concerning the architecture of a host device. The interface unit and the control unit can, for example, be implemented on the same chip and linked by a UTMI interface. They can also be implemented on two separate chips, and these chips can, for example, be linked via a ULPI interface.

A third aspect of the invention proposes a host device comprising means for implementing a process for managing a host device according to the first aspect of the invention.

A fourth aspect of the invention proposes a system comprising a host device according to the third aspect of the invention and at least one peripheral device.

These and other features, aspects, and advantages of the invention will be apparent from the following description of an exemplary embodiment.

The invention will also be better understood by referring to the drawings, in which:

FIG. 1 illustrates a conventional USB system, already described;

FIG. 2-A illustrates the main steps of a process according to one embodiment of the invention;

FIG. 2-B illustrates a USB system according to one embodiment of the invention;

FIG. 3 illustrates a timing diagram for an implementation of a process for managing a USB host device according to one embodiment of the invention;

The following sections describe an exemplary illustration of the architecture of the host device 10 based on two chips, one for the control unit and one for the interface unit, linked to each other via a ULPI interface. It is easy to apply this illustration to any other possible host device architecture, for example an architecture using a UTMI interface.

Figure 2A:
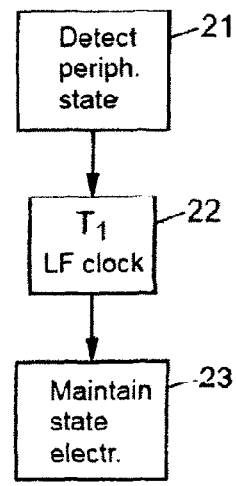
Figure 2B:
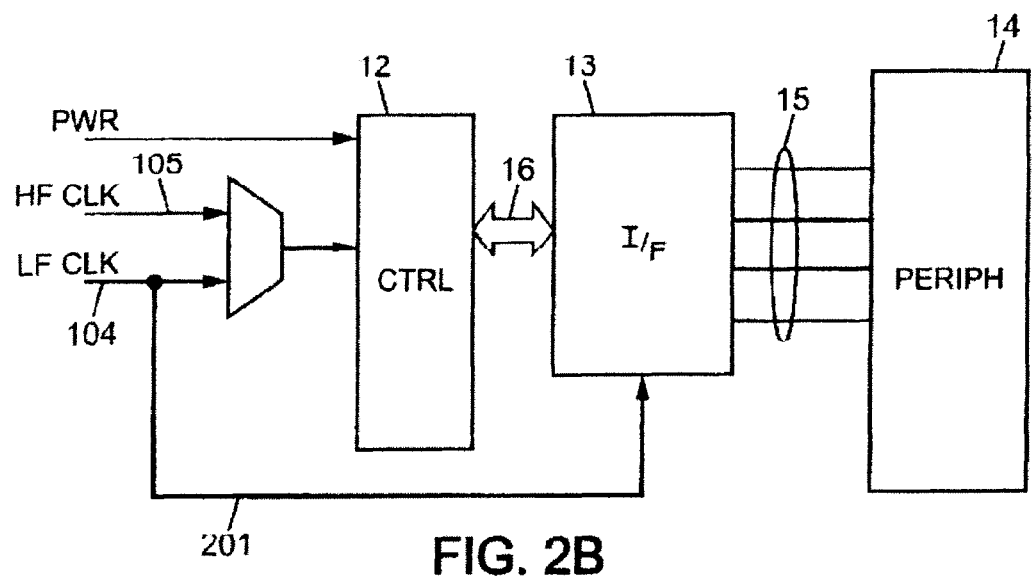

FIG. 2-A illustrates the main steps of a management process implemented according to one embodiment of the invention.

The host device is in a suspended state in which the high frequency clock is deactivated. At the host device, in a step 21, an activation state of the peripheral device is detected on the interface between the host device and the peripheral device.

Then, in a step 22, the duration of a period of time since step 21, meaning since the detection of an activation state on the interface, is determined on the basis of a low frequency clock. Then, in a step 23, it is decided to maintain this activation state on the interface by means of hardware before the expiration of said period of time.

This activation state can advantageously be artificially maintained by forcing the states of data lines on the interface between the host device and the peripheral device, slightly before expiration of the period of time concerned so as to avoid taking any false signals into account which could be detected on the interface. In the context of the USB standard in its 2.0 version, this period of time is 1 ms.

Figure 1:
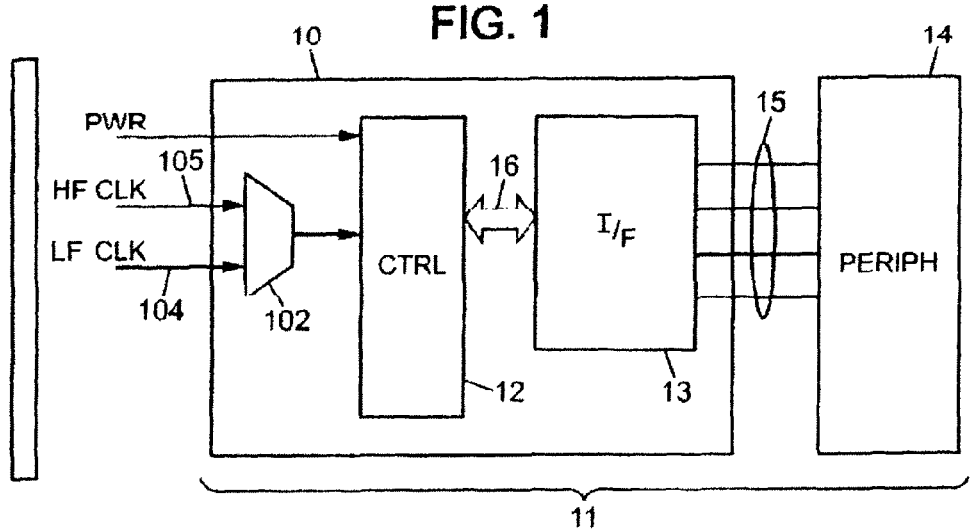

FIG. 2-B illustrates a USB system according to one embodiment of the invention. References which are the same as those used in FIG. 1 denote the same entities. For illustrative purposes only, the architecture of the host device 10 is composed of two chips 12 and 13 linked to each other by an interface 16 which can be a ULPI interface.

However, this invention applies just as easily to any other architecture of the host device. No limitation is placed on this aspect. In particular, the invention can be applied to a single-chip architecture in which the control unit and the interface unit are directly and simply linked to each other.

Note that the low frequency clock is advantageously provided here via a connection 201 to the interface unit 13. This low frequency clock can therefore be used to count periods of time when the high frequency clock is off, thus meeting the requirements of the standard while saving power.

FIG. 3 illustrates a timing diagram for an implementation of a process for managing a USB host device according to one embodiment of the invention. This timing diagram indicates four successive periods of time A, B, C and D. Period A corresponds to an active state of the host device 10 operating in synchronous mode, period B corresponds to a suspended state of the host device 10, period C corresponds to a wakeup state or resume state of the host device 10, and period D corresponds to this same device 10 once again operating in an active state.

Each horizontal line illustrates a different type of change for each of these periods of time. The first line, line 300, indicates the changes in the state of the host device 10. The device is active when the line is high, and inactive when it is in a low activation state. In the context of the USB standard version 2.0, this line represents the value of a SuspendM bit.

A second line, line 301, illustrates the changes in the activation state of a low frequency clock of the host device. This low frequency clock can remain continuously available. The power it consumes is insignificant compared to the power consumed by the high frequency clock.

A third line, line 302, illustrates the changes in activation state of the high frequency clock of the host device.

A fourth line, line 303, illustrates the changes in the state of a data line Dp, and a fifth line, line 304, illustrates the changes in the state of a data line Dm, with these data lines being lines of the USB interface between the host device and the peripheral device.

A sixth line, line 305, represents a combination of the states of the data lines Dp and Dm, and therefore illustrates a line state, which in particular can be in a state J or in a state K as defined in the USB standard version 2.0.

A seventh line, line 306, illustrates the changes in a signal received on a line of the interface between the control unit and the interface unit, corresponding to a STP pin (for 'SToP').

During the period of time A, the host USB device is in an active state with the high frequency clock also being active, which allows using the ULPI interface. The control unit can exchange messages on lines Dp and Dm by means of software. The thick segments on lines 303 and 304 illustrate this possibility of exchanges during the period A. During this period A, the peripheral device 14 can therefore receive messages from the host device 10; these messages are emitted by the control unit 12 and sent via the ULPI interface, then by the interface unit 13.

In one embodiment of the invention, when no activity of the USB peripheral device 14 is detected at the host device 10, said host device is switched to a suspended state in which the high frequency clock is off.

This switch from an active state to a suspended state is triggered between the end of the period A and the start of the period B. Therefore, during the period B:
- the high frequency clock is off as illustrated in the line 302;
- the state of the line Dp is high and the state of the line Dm is low, and as a result the line 305 is in an idle state J; and
- the STP state of the ULPI interface is low.

In general, the period B is a period during which the host device is in a suspended state in which the high frequency clock is deactivated. This period B therefore advantageously reduces the power consumption of the host device. This suspension is in compliance with the USB 2.0 specification.

Detection of activity of the peripheral device on the ULPI interface marks the end of the period B and the start of the period C. During this period C, the states of the lines Dp and Dm are reversed: the line Dp goes to a low state while the line Dm goes to a high state. This change implies a change on the line 305 which then indicates a state K, corresponding to a request to resume activity.

This period C therefore corresponds to a resumption of activity of the host device 10. At the end of the period C, the high frequency clock is once again active, as is illustrated in the line 302, and the control unit of this host device can once again use the ULPI interface internally and can therefore communicate via the external interface 15 with the peripheral device 14.

It should be stated that the USB standard imposes time constraints on the duration of the host device from a suspended state to an active state. More specifically, during this period C which is triggered by the detection of activity in the peripheral device, the host device is responsible for assuming control of the lines Dp and Dm in order to maintain the previously detected activation state:
-1- within a first period of time T1 starting from the detection of activity of the peripheral device; and
-2- for at least a second period of time T2 starting from the detection of activity of the peripheral device.

However, the first period of time is substantially smaller than the period of time required to reactivate the high frequency clock.

Advantageously, in one embodiment of the invention, the first period of time is counted in the interface unit 13 on the basis of the low frequency clock, as said clock remains active even when the host device 10 is in a suspended state.

Control of the data lines Dm and Dp is assumed by the interface unit 13 by means of hardware, until the high frequency clock is finally active and the ULPI interface 16 and the interface 15 with the peripheral device can once again be used by the host device by means of software.

In one embodiment of the invention, the host device 10 complies with the requirements of the USB 2.0 standard, section 7.1.7.7. In this case, the period of time T1 within which the host device 10 assumes control of the data lines Dm and Dp is less than or equal to 1 ms starting from the detection of activity of the peripheral device, and the period of time T2 during which an activation state is forcibly maintained on the USB interface with the peripheral device is at least 20 ms.

At the end of the period C, the high frequency clock is completely activated and therefore period D begins, which is a period of active operation of the host device. During this period, the high frequency clock is active (line 302), and the interfaces can therefore be used by the control unit. Said control unit 12 can assume control of the data lines Dp and Dm in place of the interface unit 13, as long as the period of time T2 has not expired. Then, upon expiration of the period of time T2, the data lines Dp and Dm between the host device and the peripheral device are no longer controlled by the host device, because maintaining the activation state on the interface with the peripheral device is no longer required. This expiration of the period of time T2 is illustrated by the thick segments on lines 303 and 304, which indicate that the bus between the two devices is loaded.

Figure 4:
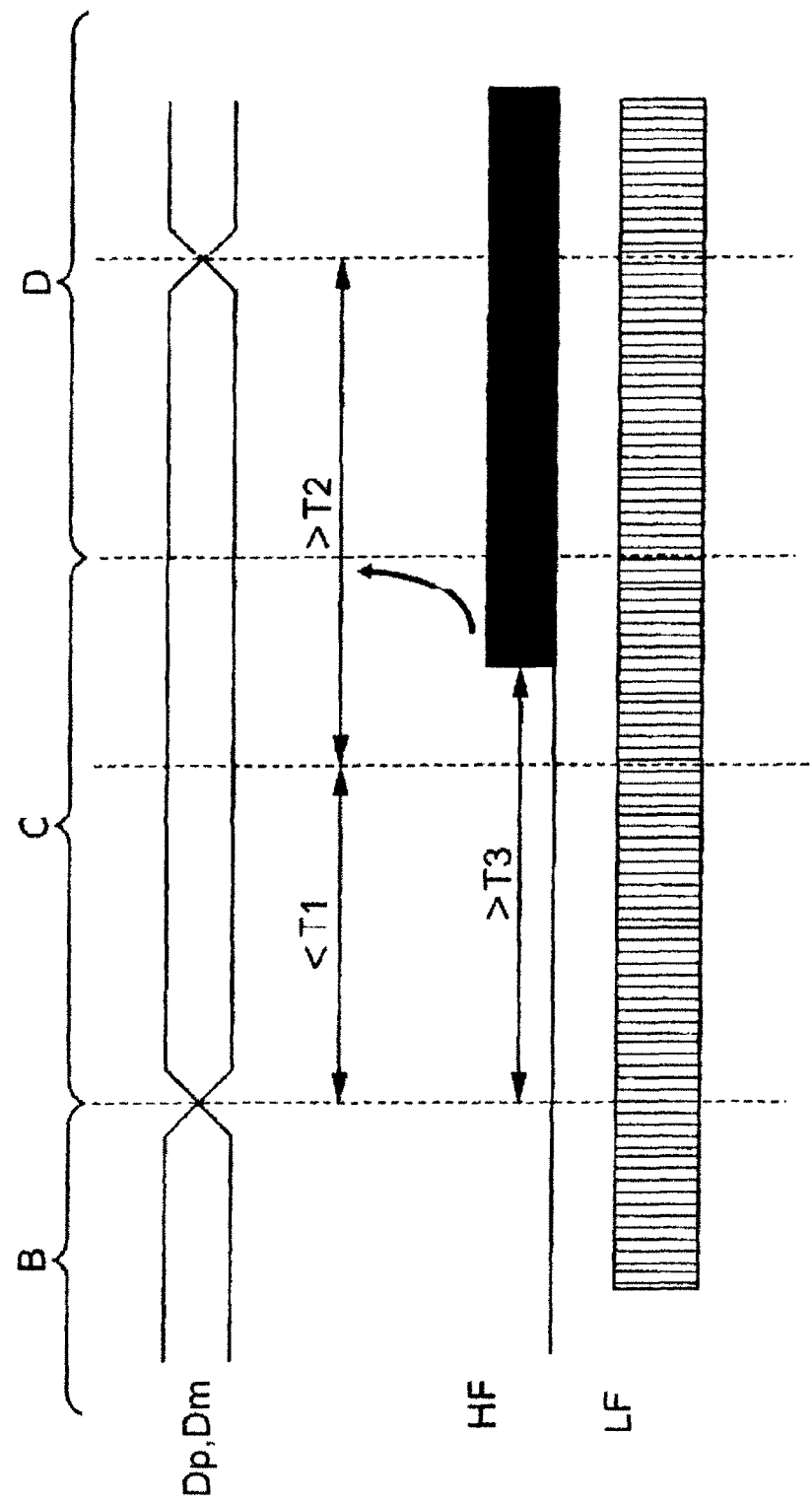
FIG. 4 illustrates in detail a wakeup period of a host device according to one embodiment of the invention.

FIG. 4 illustrates in detail the period C according to one embodiment of the invention. During this period C, a state transition occurs from a suspended state of the host device 10 to an active state of said host device. FIG. 4 uses horizontal lines to illustrate the changes in the data lines of the interface 15 Dp and Dm, the changes in the activity of the high frequency clock, and the changes in the activity of the low frequency clock.

Recall that during the period B, the host device is in a suspended state and therefore the high frequency clock is deactivated. The period C is triggered upon detection of activity of the peripheral device and ends upon complete activation of the high frequency clock, meaning when the control unit can use the interface 15 to the peripheral device 14.

The period of time $T_1$ corresponds to the maximum period of time during which the host device assumes control of the data lines Dp and Dm, in compliance with the USB standard. However, when activity of the peripheral device is detected, meaning in the illustrated example when the line Dp is low and the line Dm is high, it is recommended to wait for a certain amount of time within this period $T_1$ before triggering the activation of the host device, to avoid erroneously activating said device when a data signal is detected that does not correspond to actual activity of the peripheral device.

The USB standard requires that this state of requesting the resumption of activity be maintained for at least the period of time $T_2$.

A period of time $T_3$ corresponds to the period of time required to activate the high frequency clock. As illustrated in FIG. 4, the period of time $T_3$ is greater than the period of time $T_1$, so that it is not possible to assume control of the interface 15 by means of software, using the high frequency clock, within a period of time in compliance with the standard.

At the end of the period B, a reversal of the signals Dp and Dm is detected, which corresponds to a detection of activity of the peripheral device. In one embodiment of the invention, during the period C, the wakeup period of the host device, the following actions are taken:
- determining whether the data lines Dp and Dm are indicating a request to resume activity during a period of time sufficiently close to $T_1$;
- assuming control of the data lines Dp and Dm before the end of the period $T_1$ which is determined on the basis of the low frequency clock; and
- waking up the high frequency clock.

The activation period C of the host device ends when the high frequency clock is once again active. Therefore the period D begins when the host device can once again operate on the basis of the high frequency clock.

The data lines are controlled by the host device during at least a period of time $T_2$. Therefore when this period of time has not ended but the high frequency clock is active, the forcing of these data lines can be controlled by the control unit 12 instead of by the interface unit 13, meaning by means of software and not by means of hardware. Thus, in one embodiment of the invention, this control of the data lines is performed by means of software until the expiration of the period of time $T_2$ during the period D.

Figure 5:
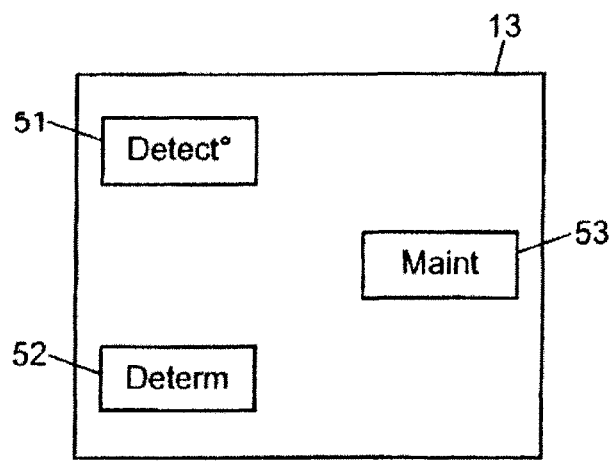
FIG. 5 illustrates a USB system according to one embodiment of the invention.

FIG. 5 illustrates an interface unit 13 of a host device 10 according to one embodiment of the invention. It comprises:
- a detection unit 51 adapted to detect an activation state of the peripheral device on said interface when the host device is in a suspended state;
- a determination unit 52 adapted to determine the duration of a period of time $T_1$ since a detection of said detection unit, on the basis of a low frequency clock; and
- a state maintainer unit 53 adapted to maintain an activation state on said interface by means of hardware before the period of time expires.

Moreover, as the host device comprises a control unit and an interface unit interfacing with the peripheral device, the units being linked to each other via a ULPI interface on the basis of the high frequency clock, the state maintainer unit is carried out by the interface unit, until a period of active operation begins for the host device.

A host device can thus comprise such an interface unit. In addition, such a host device can be adapted to activate the high frequency clock upon detection of an activation state by the detection unit, and to maintain the activation state on the interface by means of software once the high frequency clock is activated.

The state maintainer unit can advantageously be realized on the basis of flip-flops.

The invention claimed is:

1. A method for managing a host device that includes a control unit and an interface unit linked to each other via a Universal Serial Bus (USB) Transceiver Macrocell Interface (UTMI) Low Pin Interface (ULPI) interface on the basis of a high frequency clock, wherein the interface unit interfaces with a peripheral device via an interface on the basis of the high frequency clock, the method being implemented by the host device, and comprising:
   - detecting that the peripheral device on the interface is in an activation state when the host device is in a suspended state in which the high frequency clock is deactivated;
   - responsive to the detected activation state of the peripheral device, starting a timer on the basis of a low frequency clock; and
   - maintaining, by hardware of the interface unit, the activation state of the peripheral device on the interface, wherein the activation state is maintained on the basis of the high frequency clock before the expiration of a time period associated with the timer and until the host device enters an active operation state.

2. The method of claim 1, wherein detecting that the peripheral device is in the activation state comprises activating the high frequency clock, and wherein the detection and high frequency clock activation are performed by the interface unit.

3. The method of claim 2, wherein once the high frequency clock is activated, the activation state is maintained by software of the control unit.

4. A host device comprising:
   - a control unit; and
   - an interface unit linked to the control unit via a Universal Serial Bus (USB) Transceiver Macrocell Interface (UTMI) Low Pin Interface (ULPI) on the basis of a high frequency clock, the interface unit interfacing with a peripheral device on an interface and comprising:
     - a detection unit configured to detect that the peripheral device on the interface is in an activation state when the host device is in a suspended state in which the high frequency clock is deactivated;
     - a determination unit adapted start a timer on the basis of a low frequency clock responsive to the detected activation state of the peripheral device; and
     - a state maintainer unit configured to maintain the activation state of the peripheral device on the interface using hardware of the interface unit, wherein the activation state of the peripheral device is maintained before a time period associated with the timer expires and until a period of active operation begins for the host device.

5. The host device of claim 4, wherein the interface unit is configured to activate the high frequency clock responsive to the detection unit detecting the activation state of the peripheral device, and wherein the activation state on the interface is maintained by software of the control unit once the high frequency clock is activated.

6. A peripheral device control system comprising:
   - at least one peripheral device; and
   - a host device comprising:
     - a control unit; and
     - an interface unit linked to the control unit via a Universal Serial Bus (USB) Transceiver Macrocell Interface (UTMI) Low Pin Interface (ULPI) on the basis of a high frequency clock, the interface unit interfacing with the peripheral device on an interface and comprising:
       - a detection unit configured to detect that the peripheral device on the interface is in an activation state when the host device is in a suspended state in which the high frequency clock is deactivated;
       - a determination unit adapted start a timer on the basis of a low frequency clock responsive to the detected activation state of the peripheral device; and
       - a state maintainer unit configured to maintain the activation state of the peripheral device on the interface using hardware of the interface unit, wherein the activation state of the peripheral device is maintained before a time period associated with the timer expires and until a period of active operation begins for the host device.

* * * * *